United States Patent
Lee

(10) Patent No.: US 8,241,779 B2
(45) Date of Patent: Aug. 14, 2012

(54) BATTERY COVER MECHANISM INCLUDING SLIDING UNIT TO LATCH BATTERY TO HOUSING OF ELECTRONIC DEVICE

(75) Inventor: Szu-Hsien Lee, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 265 days.

(21) Appl. No.: 12/630,932

(22) Filed: Dec. 4, 2009

(65) Prior Publication Data

US 2010/0330407 A1    Dec. 30, 2010

(30) Foreign Application Priority Data

Jun. 25, 2009    (CN) .......................... 2009 1 0303673

(51) Int. Cl.
*H01M 2/10* (2006.01)
*H01K 5/00* (2006.01)
*H01K 7/00* (2006.01)
*G06F 1/16* (2006.01)
*E05C 1/02* (2006.01)

(52) U.S. Cl. ....... 429/100; 429/97; 429/98; 361/679.01; 361/679.02; 292/137

(58) Field of Classification Search .................... 429/97, 429/98, 100; 361/679.01, 679.02; 292/137
See application file for complete search history.

(56) References Cited

U.S. PATENT DOCUMENTS

| 4,880,712 A | * | 11/1989 | Gordecki | 429/97 |
| 2010/0035133 A1 | * | 2/2010 | Wang | 429/100 |
| 2010/0112426 A1 | * | 5/2010 | Wu et al. | 429/100 |
| 2010/0258626 A1 | * | 10/2010 | Watanabe et al. | 235/380 |

FOREIGN PATENT DOCUMENTS

| CN | 1086050 A | 4/1994 |
| CN | 1146051 A | 3/1997 |
| WO | WO 2009057496 A1 * | 5/2009 |

* cited by examiner

*Primary Examiner* — Basia Ridley
*Assistant Examiner* — Sean P Cullen
(74) *Attorney, Agent, or Firm* — Altis Law Group, Inc.

(57) ABSTRACT

A battery assembling mechanism of electronic device includes a housing and a sliding assembly, the housing has a first sidewall, the first sidewall defines an assembling hole; The sliding assembly includes a sliding unit slidably assembled on the housing and able to block a portion of the assembling hole. The battery can be latched or taken out from the housing by sliding the sliding unit.

12 Claims, 6 Drawing Sheets

BATTERY COVER MECHANISM INCLUDING SLIDING UNIT TO LATCH BATTERY TO HOUSING OF ELECTRONIC DEVICE

BACKGROUND

1. Field of the Invention

The present disclosure relates to a battery assembling mechanism for an electronic device.

2. Description of Related Art

Portable electronic devices such as mobile phones and personal digital assistants (PDAs) are widely used. When a battery is installed in the portable electronic device, the battery is generally shielded and fixed in place by a battery assembling mechanism.

A commonly used battery assembling mechanism includes a cover and a housing. The cover includes a pin at on one end and a protrusion at an opposite end. The housing defines a receiving hole and a holding aperture. The protrusion can be received in the holding aperture, and the cover is impelled towards the housing until the pin is received into the receiving hole. As such, the cover securely engages the housing as the protrusion seated in the holding aperture. However, the cover usually needs to be separated from the housing for removing the battery. The separated cover may easily become lost.

Therefore, there is room for improvement within the art.

BRIEF DESCRIPTION OF THE DRAWINGS

Many aspects of the present battery assembling mechanism of electronic device can be better understood with reference to the following drawings. The components in the various drawings are not necessarily drawn to scale, the emphasis instead being placed upon clearly illustrating the principles of the present battery assembling mechanism of electronic device. Moreover, in the drawings, like reference numerals designate corresponding parts throughout the diagrams.

DETAILED DESCRIPTION OF THE EMBODIMENT

Figure 1:
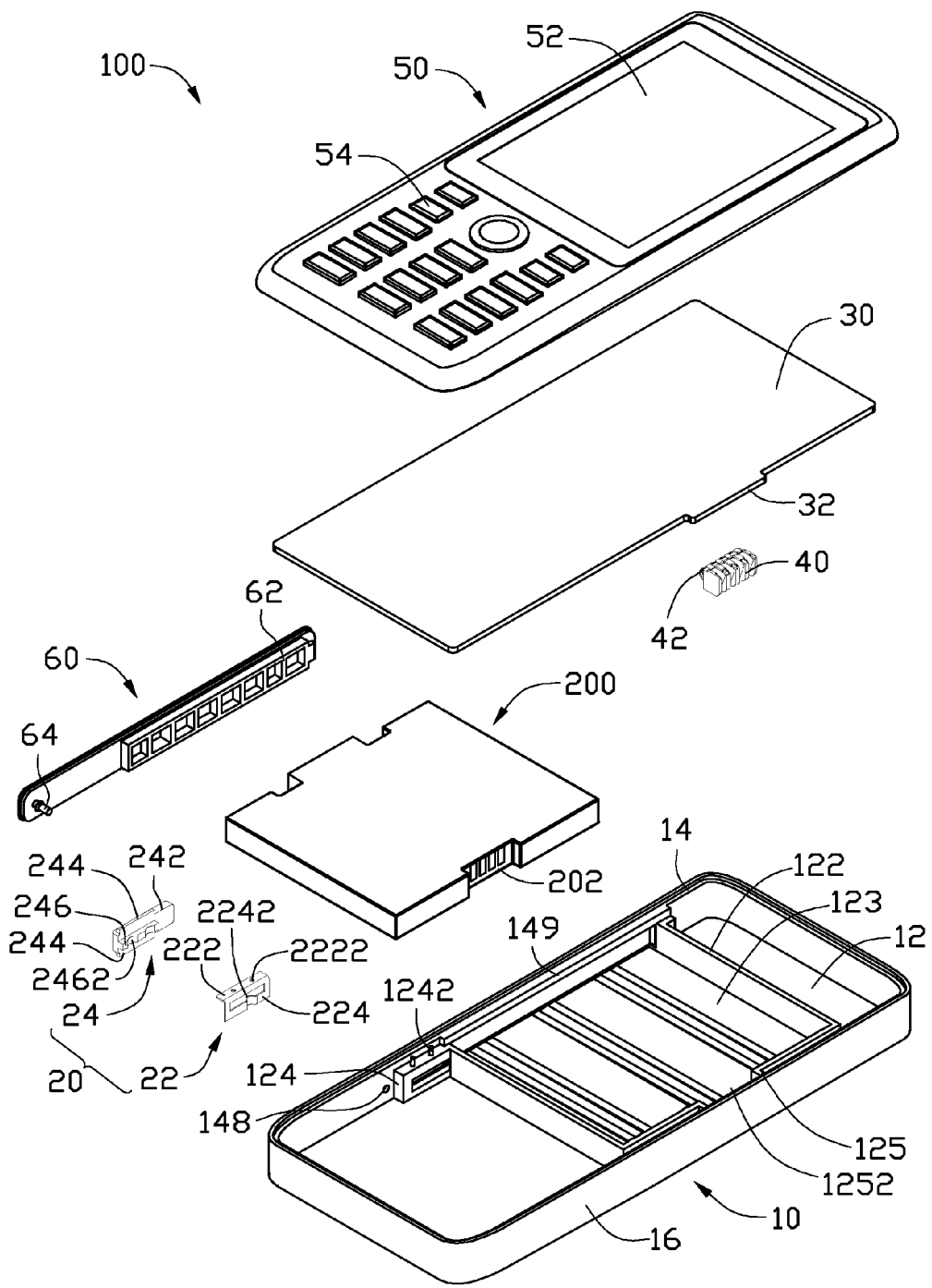
FIG. 1 is a disassembled view of the battery assembling mechanism of an electronic device as disclosed.

FIG. 1 shows a battery assembling mechanism of electronic device 100. The battery assembling mechanism 100 includes a housing 10, a sliding assembly 20, a circuit board 30, a connecting terminal 40, a cover 50 and a seal strip 60.

Figure 2:
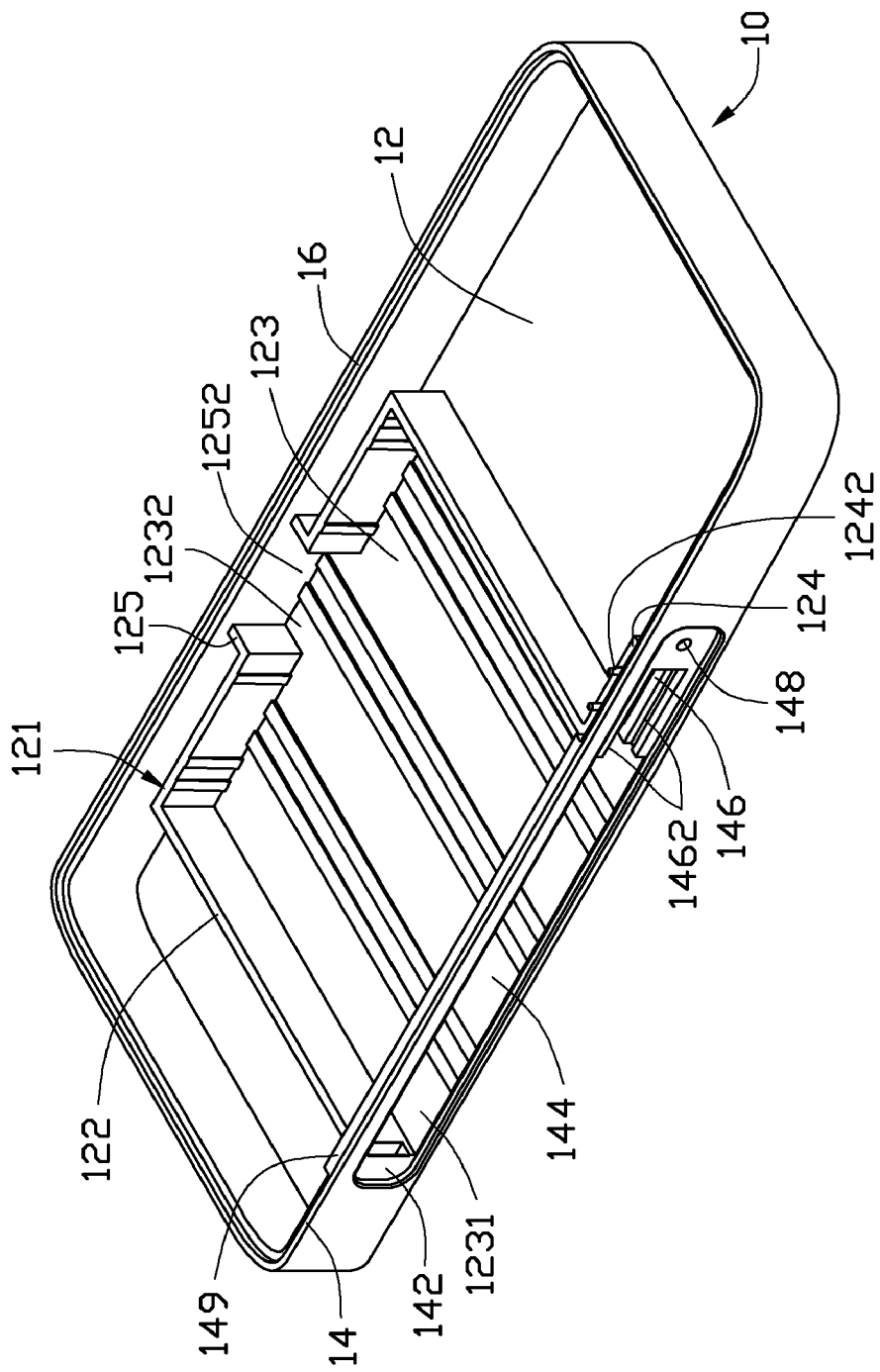
FIG. 2 is a housing schematic view shown in FIG. 1.

FIG. 2 further shows the housing 10 is a frame including a bottom wall 12, a first sidewall 14, and a second sidewall 16. The first sidewall 14 and the second sidewall 16 are formed at opposite sides of the bottom wall 12. The bottom wall 12 has a receiving frame 121 to receive a battery 200. The receiving frame 121 includes two frame walls 122 symmetrically arranged on the bottom wall 12. The frame walls 122 cooperatively define a receiving chamber 123. The receiving chamber 123 has a first opening 1231 facing the first sidewall 14 and a second opening 1232 facing the second sidewall 16.

The bottom wall 12 further has an assembling wall 124 and two connecting walls 125. The assembling wall 124 is formed at the side of the first opening 1231, parallelly abutting the first sidewall 14. The assembling wall 124 has two poles 1242 protruding from the top surface. The poles 1242 are for assembly with the sliding assembly 20. The two connecting walls 125 are located at two sides of the second opening 1232 corresponding to and perpendicular with the second sidewall 16. The two connecting walls 125 and the second sidewall 16 cooperatively define an accommodating chamber 1252 to accommodate the connecting terminal 40.

The first sidewall 14 defines a matching groove 142 exposed at the outer surface. The matching groove 142 corresponds to the first opening 1231 and is longer than the first opening 1231. The matching groove 142 defines an assembling hole 144 and an adjacent fixing aperture 148 through its bottom wall. The assembling hole 144 is aligned with the first opening 1231. An engaging slot 146 is defined through the assembling wall 124. The engaging slot 146 communicates with a side of the assembling hole 144. The engaging slot 146 has a guiding slot 1462 defined through its sidewall. The guiding slot 1462 extends along the assembling wall 124 and is used to receive the sliding assembly 20. The first sidewall 14 has a protruding bar 149 protruding inside the housing 10. The protruding bar 149 is located adjacent to the first opening 1231 and latches the battery 200.

The sliding assembly 20 includes a holding member 22 and a sliding unit 24. The holding member 22 includes a first plate portion 222 and a second plate portion 224. The second plate portion 224 is perpendicular to the first plate portion 222. The first plate portion 222 defines two fixing holes 2222 to receive the poles 1242 of the assembling wall 124. The second plate portion 224 has an arcuate protrusion 2242 protruding from the same side as the first plate portion 222. The protrusion 2242 can be received in the engaging slot 146, engaging the sliding unit 24. The sliding unit 24 is engagable with the engaging slot 146 and includes a main board 242, two guiding flanges 244, and an engaging flange 246. The guiding flanges 244 protrude from the top surface and the bottom surface of the main board 242 correspondingly. The engaging flange 246 protrudes laterally from a side surface of the main board 242. The main board 242 has substantially the same width as the engaging slot 146 and can be assembled in the engaging slot 146. The main board 242 has pressing strips 2422 (shown in FIG. 3) formed at a side surface opposite to the engaging flange 246 to facilitate easy manipulation of the sliding unit 24. The two guiding flanges 244 engage in/with the two guiding slot 1462 correspondingly. The engaging flange 246 is located at an end of the side surface, including two adjacent curved latching recesses 2462. The latching recesses 2462 are engaged by corresponding protrusions 2242 of the holding member 22. Hence, the sliding unit 24 can be secured in different longitudinal positions within the engaging slot 146.

The circuit board 30 is received in the housing 10 and covers the receiving frame 121. The circuit board 30 includes a peripheral protruding flange 32 covering the accommodating chamber 1252. The connecting terminal 40 is used to electronically connect the circuit board 30 and the battery 200. The connecting terminal 40 can be assembled in the accommodating chamber 1252 and secures the circuit board 30. The connecting terminal 40 includes a plurality of elastic pins 42 arranged in an array to electronically connect the battery 200. The cover 50 is engagable with the housing 10. A display window 52 and a keypad 54 are arranged on opposite ends of the cover 50 correspondingly.

The seal strip 60 corresponds to matching groove 142 in shape and is used to assemble in the matching groove 142 of the sidewall 16 to cover the battery 200. The seal strip 60 can be made of a resilient material such as rubber. The seal strip 60 has a touching block 62 and a connecting column 64. The touching block 62 corresponds to the assembling hole 144 in size and shape and can be inserted into the assembling hole 144. The connecting column 64 is positioned adjacent to an end of the seal strip 60, engaging the fixing aperture 148 of the sidewall 16 to secure the seal strip 60 in the matching groove 142.

The battery 200 can be received in the receiving frame 121, the battery 200 has a plurality of conducting terminals 202 on the sidewall for contacting the elastic pins 42 of connecting terminal 40.

Figure 3:
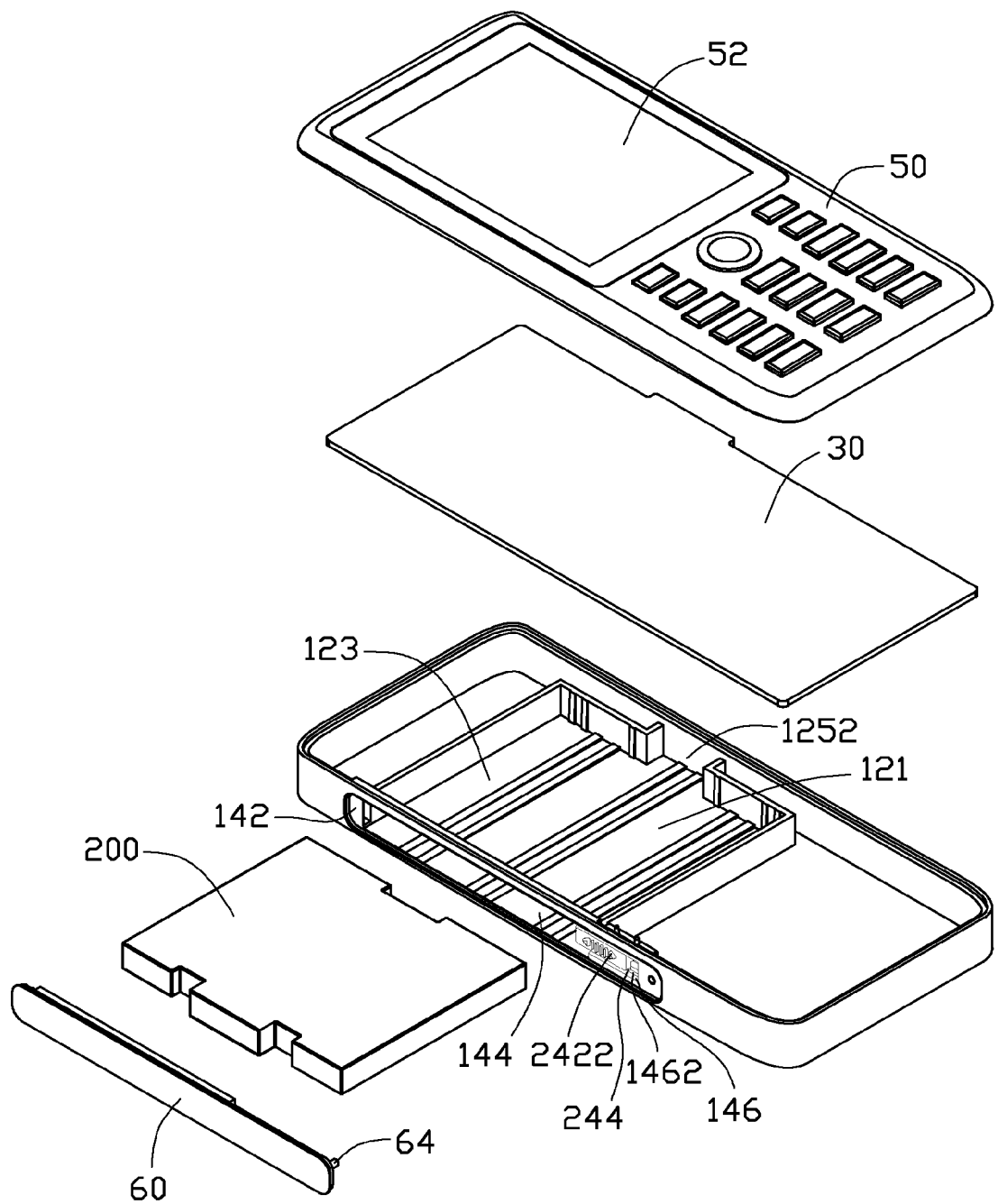
FIG. 3 is a schematic view of the battery assembling mechanism shown in FIG. 1 in assembly.

Referring to FIG. 3, to assemble the battery assembling mechanism 100, the connecting terminal 40 is secured on the protruding flange 32 of the circuit board 30. The holding member 22 of the sliding assembly 20 is mounted onto the assembling wall 124. The fixing holes 2222 of the first plate portion 222 receive the poles 1242 of the assembling wall 124. The protrusion 2242 of the second plate portion 224 is latched into the engaging slot 146 of the assembling wall 124. The sliding unit 24 of the sliding assembly 20 is installed into the engaging slot 146 of the housing 10, and the two guiding flanges 244 are inserted into the two guiding slot 1462 of the assembling wall 124. As such, the sliding unit 24 is longitudinally slidable relative to the engaging slot 146. The sliding unit 24 is limited by a latching recess 2462 of the engaging flange 246. The latching recess 2462 receives the protrusion 2242 of the second plate portion 224. The sliding unit 24 can be slid by pulling the sliding unit 24. The circuit board 30 is assembled in the housing 10, the circuit board 30 covers the receiving frame 121 and the connecting terminal 40 is received in the accommodating chamber 1252 of the housing 10. The seal strip 60 can be mounted into the matching groove 142 of the first sidewall 14. The connecting column 64 of the seal strip 60 is inserted into the fixing aperture 148 of the first sidewall 14, the touching block 62 of the seal strip 60 is latched into the assembling hole 144.

Figure 4:
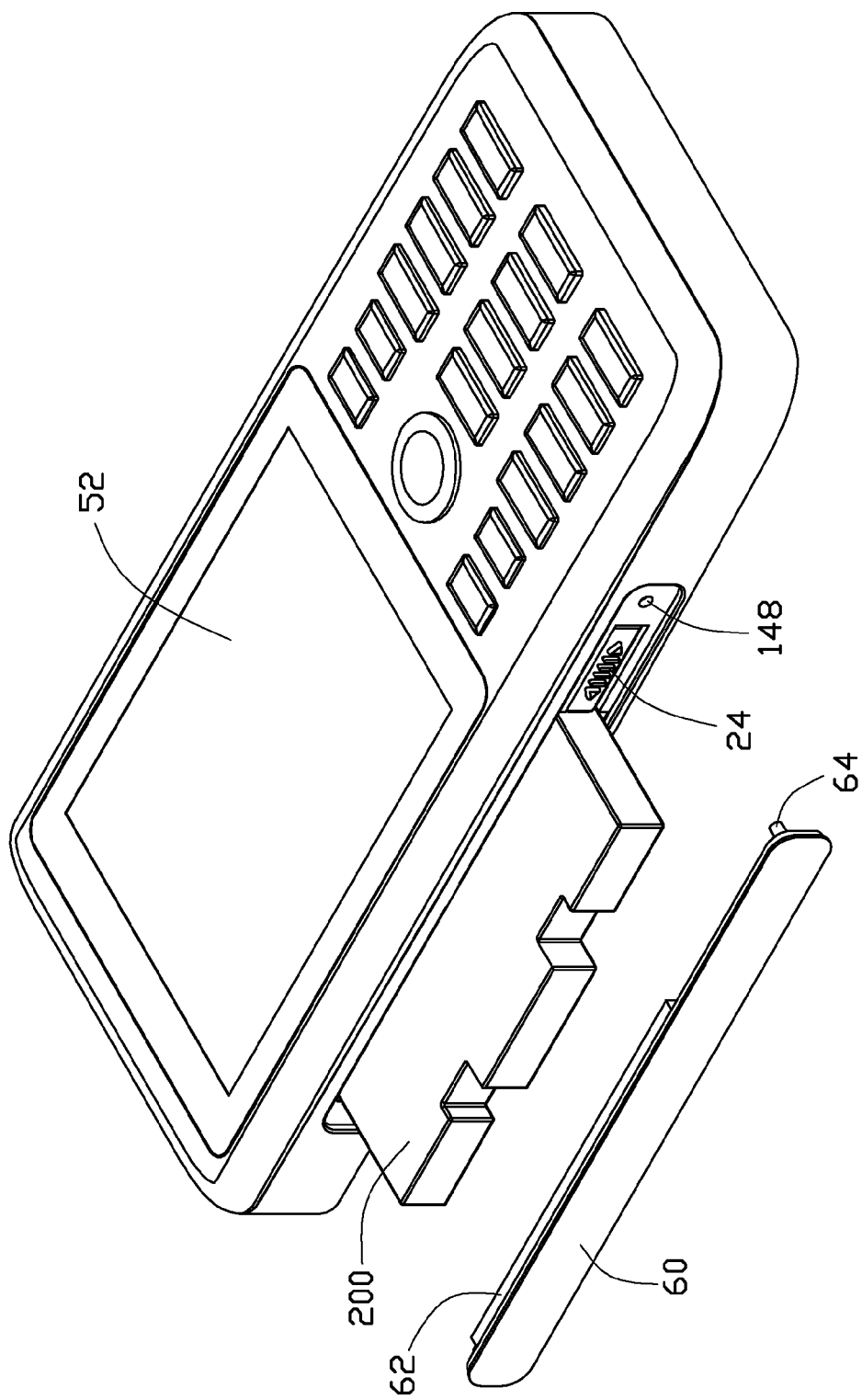
FIG. 4 is a schematic view of the battery assembling mechanism shown in FIG. 1 while assembling a battery.
Figure 5:
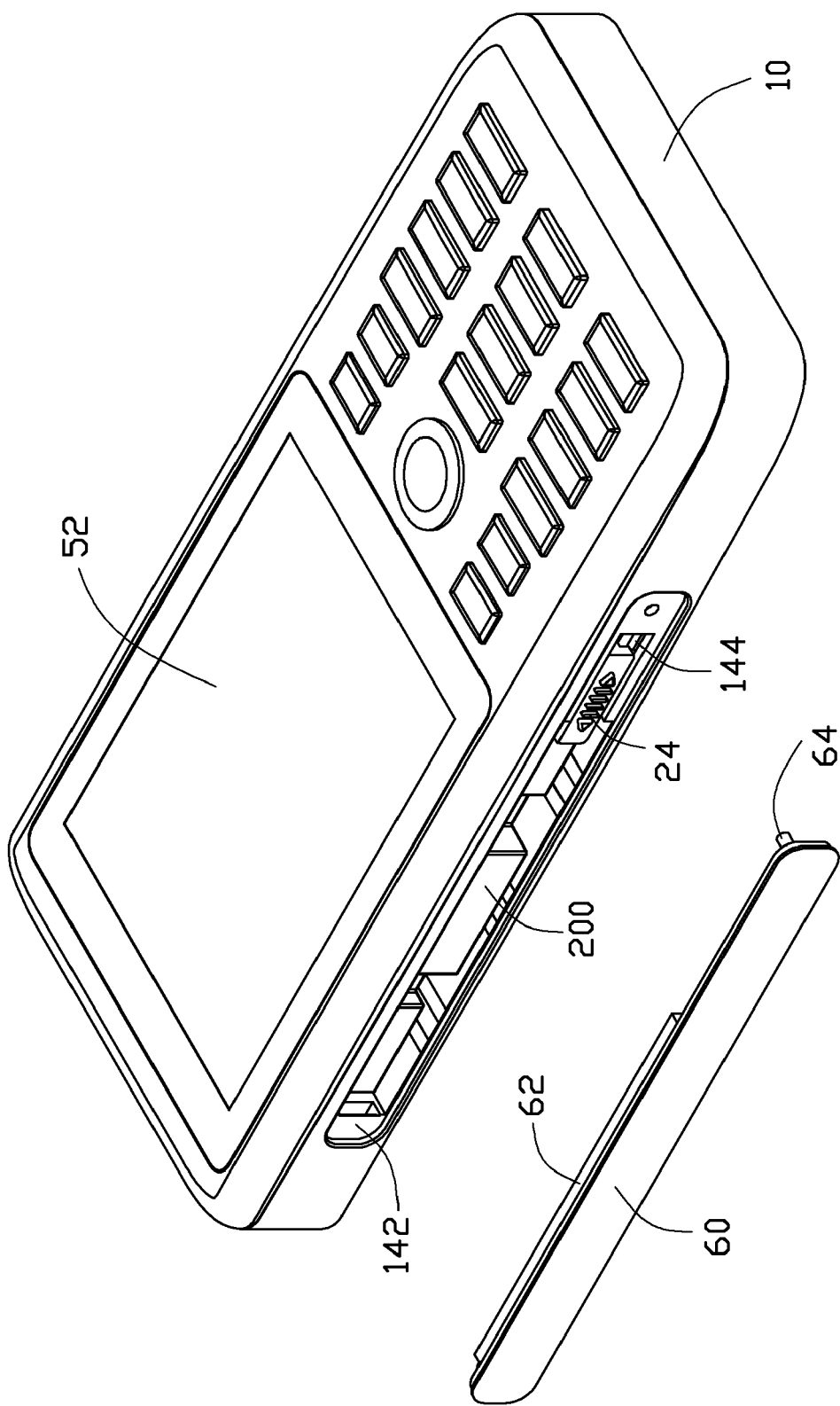
FIG. 5 is a schematic view of the battery assembling mechanism shown in FIG. 4 while assembling the battery.
Figure 6:
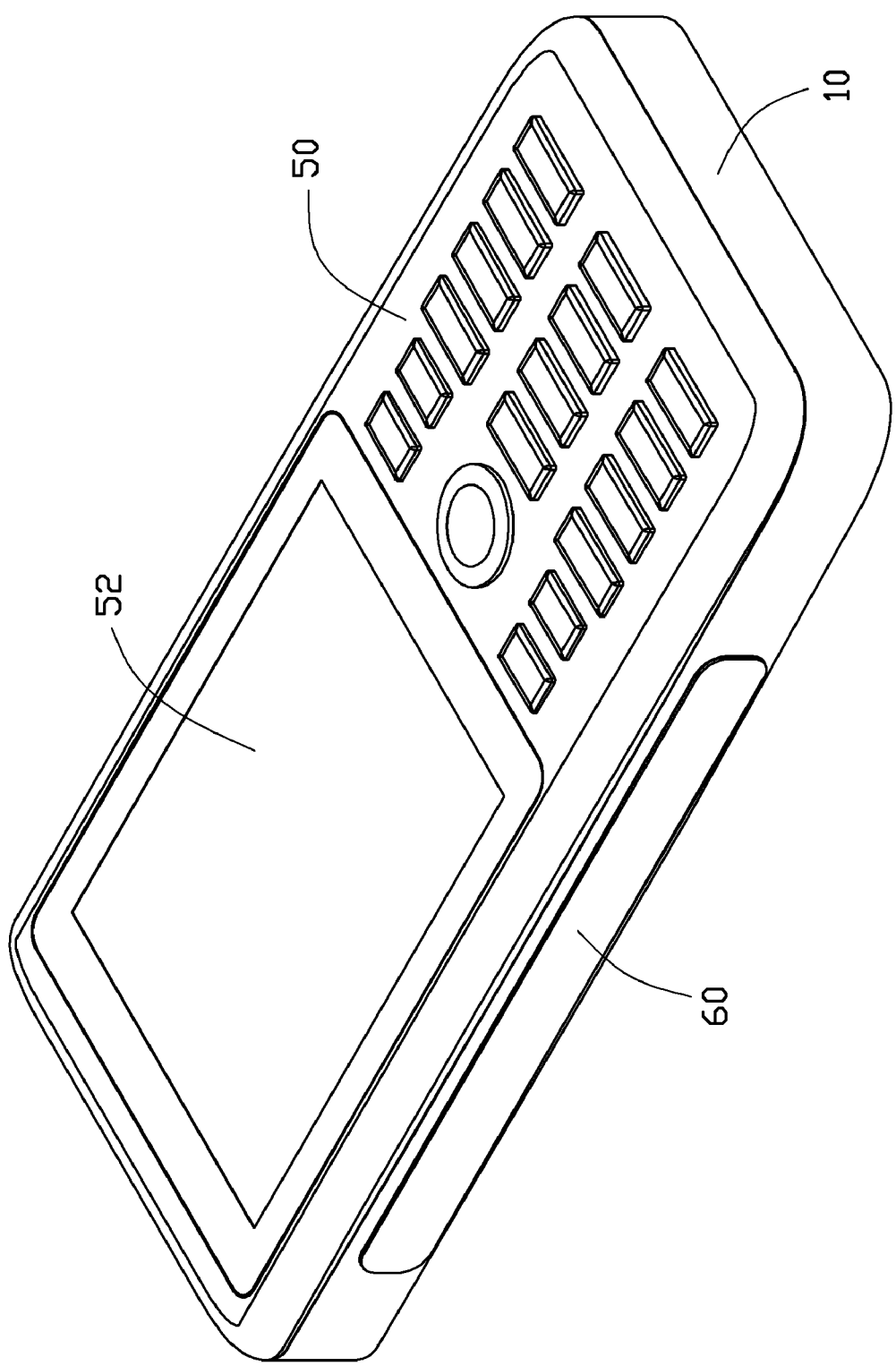
FIG. 6 is a schematic view of the electronic device shown in FIG. 1 after assembling the battery.

FIG. 4 through FIG. 6 shows a process of inserting the battery 200 into the housing 10. The seal strip 60 is opened and the sliding unit 24 is moved to a position not blocking any portion of the assembling hole 144. Therefore, the assembling hole 144 is opened completely, the sliding unit 24 is latched by engagement of the protrusion 2242 with the latching recess 2462. The battery 200 can be placed into the receiving chamber 123. The conducting terminals 202 of the battery 200 contact with the elastic pins 42 of the connecting terminal 40. After that the battery 200 is inserted, the sliding unit 24 can be moved to a position blocking a portion of the assembling hole 144. Therefore, one end of the sliding unit 24 blocks a portion of the assembling hole 144 and resists a portion of the battery 200. Thus, the battery 200 is latched in the receiving chamber 123. The sliding unit 24 is further latched by engagement of the other engaging of the protrusion 2242 into the latching recess 2462. The seal strip 60 covers and seals the matching groove 142 by fixing the connecting column 64 into the fixing aperture 148. The touching block 62 of the seal strip 60 is received into the assembling hole 144, resisting the battery 200. Therefore, the battery 200 is secured in the housing 10.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A battery assembling mechanism of an electronic device for receiving a battery, comprising:
   a housing having a first sidewall, the first side wall defining an assembling hole; and
   a sliding assembling including holding member and a sliding unit, the holding member including protrusion, the sliding unit defining two latching recesses, the sliding unit slidably assembled on the housing and the sliding unit being able to slide to block a portion of the assembling hole, the protrusion engaging with one of the two latching recesses to latch the sliding unit on the holding member;
   wherein the battery can be latched in or taken out from the housing by sliding the sliding unit.

2. The battery assembling mechanism as claimed in claim 1, wherein the first sidewall forms an assembling wall in an internal surface thereof, the assembling wall is located at an end of the assembling hole, the first sidewall defines an engaging slot communicating with the assembling hole and passing through the assembling wall, the sliding unit is slidably received in the engaging slot.

3. The battery assembling mechanism as claimed in claim 2, wherein the sliding unit includes a main board, the main board has two guiding flanges formed, the assembling wall defines two guiding slots at two sides of the engaging slot, the two guiding flanges are slidably received in the two guiding slots respectively.

4. The battery assembling mechanism as claimed in claim 2, wherein the holding member includes a first plate portion and a second plate portion perpendicular with the first plate portion, the first plate portion defines two fixing holes, the protrusion protrudes from the second plate portion, the assembling wall forms two poles, the two poles latch into the two fixing holes, and the protrusion latches into the engaging slot.

5. The battery assembling mechanism as claimed in claim 2, wherein the first sidewall defines a matching groove, the battery assembling mechanism includes a seal strip, the seal strip is detachably received in the matching groove.

6. The battery assembling mechanism as claimed in claim 5, wherein the assembling hole and the engaging slot are defined in the matching groove.

7. The battery assembling mechanism as claimed in claim 5, wherein the seal strip has a connecting column protruding therefrom, the matching groove has a fixing aperture, the connecting column latches into the fixing aperture when the seal strip is received in the matching groove.

8. The battery assembling mechanism as claimed in claim 1, wherein the housing includes a bottom wall, the bottom wall has a receiving frame formed, the receiving frame includes two frame walls, the two frame walls define a receiving chamber having a first opening aligning with the assembling hole.

9. The battery assembling mechanism as claimed in claim 8, wherein the receiving chamber has a second opening opposite to the first opening, the housing defines an accommodating chamber communicating with the second opening, the battery assembling mechanism includes a circuit board securing a connecting terminal, the circuit board covers the receiving chamber and the connecting terminal is received in the accommodating chamber.

10. The battery assembling mechanism as claimed in claim 9, wherein the connecting terminal has a plurality of pins formed to communicate electronically with the battery.

11. A battery assembling mechanism of an electronic device for receiving a battery, comprising a housing including a bottom wall, a first sidewall and a second sidewall at opposite side of the bottom wall, the bottom wall forming a receiving frame to receive the battery, the receiving frame having a first opening toward the first sidewall, the first sidewall defining an assembling hole aligning with the first opening;

a sliding assembly includes a holding member and a sliding unit, the holding member including a protrusion, the sliding unit defining two latching recesses, the sliding unit slidably assembled on the first sidewall and being able to extend to block a portion of the assembling hole, the protrusion engaging with one of the two latching recesses to latch the sliding unit on the holding member;

wherein the battery can be latched in the receiving frame or taken out of the housing by moving the sliding unit into or out of a position blocking the portion of the assembling hole.

12. The battery assembling mechanism as claimed in claim 11, wherein the first sidewall forms an assembling wall in an internal side surface thereof, the assembling wall is located at an end of the assembling hole, the first sidewall defines an engaging slot connecting with the assembling hole and running through the assembling wall, the sliding unit is slidably received in the engaging slot.

* * * * *